United States Patent [19]

Jacky

[11] Patent Number: 5,430,951
[45] Date of Patent: Jul. 11, 1995

[54] RETRACTABLE TAPE WITH TELESCOPING ARMS

[76] Inventor: Ken Jacky, 7116 Fischer Creek Rd., Cleveland, Wis. 53015-1316

[21] Appl. No.: 202,992

[22] Filed: Feb. 28, 1994

[51] Int. Cl.⁶ .............................................. G01B 3/10
[52] U.S. Cl. ..................................... 33/760; 33/768; 33/770
[58] Field of Search ................... 33/27.03, 759, 760, 33/761, 768, 770, 757, 758

[56] References Cited

U.S. PATENT DOCUMENTS

| | | |
|---|---|---|
| 838,463 | 12/1906 | Saxton ............................... 33/761 |
| 1,636,036 | 7/1927 | Bartlett . |
| 1,684,566 | 9/1928 | Winkler .............................. 33/770 |
| 2,065,143 | 12/1936 | Metcalf .............................. 33/760 |
| 2,108,251 | 2/1938 | Clark ............................... 33/27.03 |
| 2,174,440 | 9/1939 | Foley .............................. 33/27.03 |
| 2,349,670 | 5/1944 | Moxey ............................. 33/27.03 |
| 2,571,569 | 10/1951 | Greenwood . |
| 2,581,858 | 1/1952 | Hilt et al. ........................... 33/768 |
| 2,582,488 | 1/1952 | Kroenlein ......................... 33/27.03 |
| 2,934,827 | 5/1960 | Barto .............................. 33/27.03 |
| 3,021,599 | 2/1962 | Odom . |
| 3,181,242 | 5/1965 | Cook . |
| 3,190,008 | 6/1965 | Weiss . |
| 3,281,943 | 11/1966 | Maksim, Jr. . |
| 3,289,306 | 12/1966 | Todd . |
| 3,390,461 | 7/1968 | Anderson . |
| 3,680,214 | 8/1972 | Quenot . |
| 4,023,277 | 5/1977 | Fizer ................................. 33/761 |
| 4,103,426 | 8/1978 | Robin ............................. 33/27.03 |
| 4,227,314 | 10/1980 | Schliep ............................. 33/480 |
| 4,989,341 | 5/1991 | Scotese ............................ 33/759 |

FOREIGN PATENT DOCUMENTS

| | | | |
|---|---|---|---|
| 0144250 | 2/1954 | Germany ........................ 33/27.03 |
| 0684493 | 3/1965 | Italy ............................... 33/27.03 |
| 3303819 | 8/1984 | Sweden ........................... 33/27.03 |

Primary Examiner—Thomas B. Will
Attorney, Agent, or Firm—Francis J. Bouda

[57] ABSTRACT

The retractable tape of the present invention includes a housing from which a flexible, metallic retractable tape can be withdrawn. The tape has, at its outer end, a telescoping arm which extends at right angles to the zero-mark on the tape. A second telescoping arm is fastened to the housing from which the tape is withdrawn and is positioned at right angles to the tape and housing at a point where the tip of the telescoping arm is in alignment with the index marker on the housing. The telescoping arms can extend twelve inches from the tape and housing. The tape can be retracted into the housing, and the arms can be telescopically contracted so that when the tape is retracted into the case and the arms are contracted, the device occupies a minimal space in a mechanic's toolbox.

1 Claim, 1 Drawing Sheet

TRAM GAUGE

FLEXIBLE TAPE

RETRACTABLE TAPE WITH TELESCOPING ARMS

BACKGROUND OF THE INVENTION

Flexible, retractable extension tapes have long been known, and they are generally metallic, formed with a slight curve so that they can extend in a stiffened condition when withdrawn from a case or housing. Such devices are very efficient for measuring linear distances with no intervening obstruction.

There has also been well-known in the art a device generally referred to as a "tram gauge" which includes a rigid measuring rod, one end of which a telescoping arm may be fixed, and along the indicator/arm a second telescoping pointer can be slid so as to measure the distances between the tips of the two telescoping arms. Such device, however, is cumbersome because if the indicator arm is short enough to fit into a mechanic's toolbox, it is generally ineffective for measuring long distances and, contrarily, if the arm is long enough to be suitable for measuring large expanses, it will not fit into or easily be carried by a mechanic in his toolbox.

Other types of measuring devices such as calipers for accurately measuring small distances or flexible chain-like devices for measuring large dimensions such as 10 yards in a football field, are also well-known.

However, there has not been made available any device which combines the compactness of a flexible tape and the accurate telescoping measurements of a tram-gauge device.

U.S. patents relating to this general field include the following:

| Bartlett | 1,636,036 | Jul. 19, 1927 |
| Greenwood | 2,571,569 | Oct. 16, 1951 |
| Odom | 3,021,599 | Feb. 20, 1962 |
| Weiss | 3,190,008 | June 22, 1965 |
| Cook | 3,181,242 | May 4, 1965 |
| Maksim, Jr. | 3,281,943 | Nov. 1, 1966 |
| Todd | 3,289,306 | Dec. 6, 1966 |
| Anderson | 3,390,461 | Jul. 2, 1968 |
| Quenot | 3,680,214 | Aug. 1, 1972 |
| Schliep | 4,227,314 | Oct. 14, 1980 |
| Scotese | 4,989,341 | Feb. 5, 1991 |

Of the above-mentioned patents, Maksim U.S. Pat. No. 3,281,943 discloses a flexible extension tape for measuring irregular objects, but it does not include the telescoping devices of the present invention.

Quenot U.S. Pat. No. 3,680,214, particularly at FIGS. 8a, 8b and 8c show how a measuring tape can include a telescopic device.

The remainder of the patents are generally related to this field but, more specifically, to a non-retractable measuring instrument such as the tram gauge.

It is believed that there is no prior disclosure of a combination which includes a flexible retractable tape and telescoping measuring pointers, all of which can be compacted into a small device capable of being easily carried in a mechanic's toolbox and used for measuring extended distances over irregular obstructions.

Therefore, it is an object of the present invention to provide a retractable measuring tape with telescoping extension members permanently fixed thereto to enable a mechanic or similar worker to measure the distance between two points where there is an intervening obstacle.

A further object of the present invention is to provide a compact measuring device, including telescoping measuring points, the tips of which can be extended in position at the points to be measured, but wherein the measuring tape does not have to move in a straight line between the two positions to be measured.

Still another object of the present invention is to provide a measuring device similar to a "tram gauge", but which is flexible and can be collapsed into a very small space, so as to fit into a mechanic's toolbox.

With the above and other objects in view, further information and a better understanding of the present invention may be achieved by referring to the following detailed description:

DETAILED DESCRIPTION

For the purpose of illustrating the invention, there is shown in the accompanying drawings a form thereof which is at present preferred, although it is to be understood that the various instrumentalities of which the invention consists can be variously arranged and organized, and that the invention is not limited to the precise arrangement and organizations of the instrumentalities as herein shown and described.

In the drawings, wherein like reference characters indicate like parts:

Figure 1:
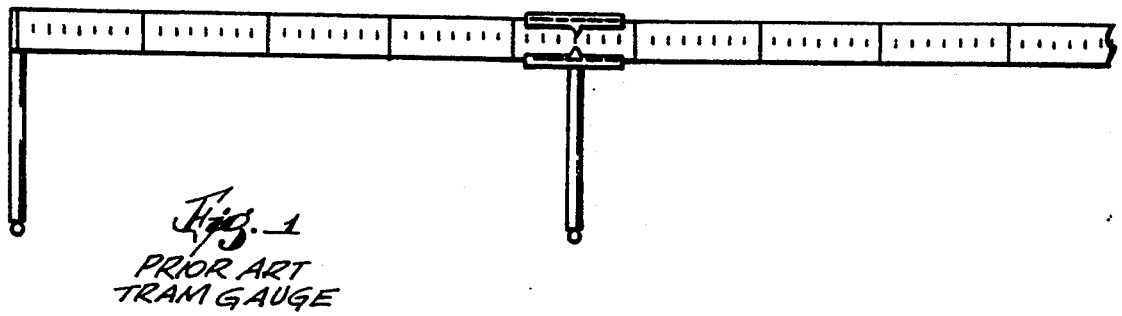
FIG. 1 is an illustration of a "tram gauge" as well-known in the prior art.
Figure 2:
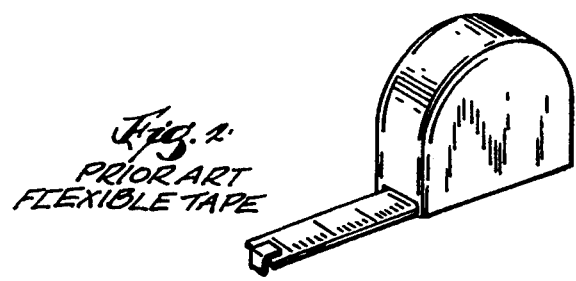
FIG. 2 is an illustration of a flexible, collapsible measuring tape also well-known in the prior art.
Figure 4:
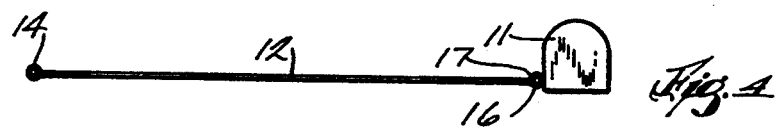
FIG. 4 is a bottom plan view taken generally along line 4—4 of FIG. 3.
Figure 3:
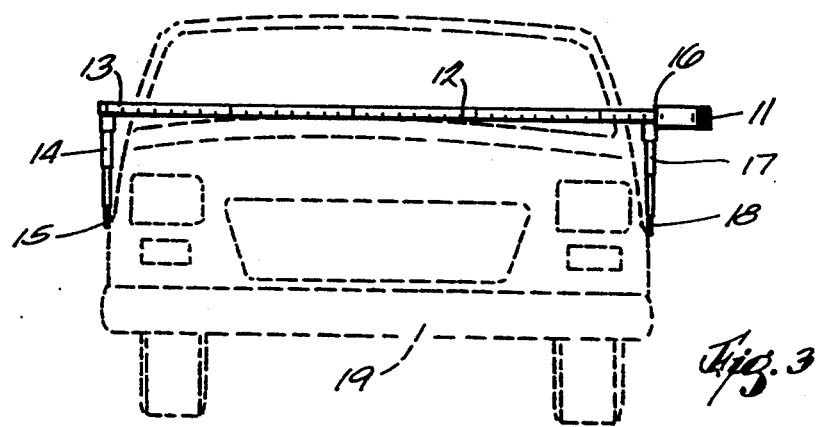
FIG. 3 is a top front elevational view of the retractable measuring tape of the present invention.

Referring now to FIGS. 3 and 4, there is shown a tape-housing (11) from which a flexible metallic measuring tape (12) can be withdrawn through the opening (16) in a case (11).

At the end (13) of the tape (12), a telescoping extensible finger or arm (14) is permanently fastened at it's bare so that the tip (15), when extended, is in alignment with the zero-point on the tape (12).

Fastened at it's bare to the case (11), generally at right angles to the case and to the tape (12) and also parallel to the arm (14) is a second telescoping arm or finger (17) which is permanently fastened on the case and fastened securely so that the tip (18) is in alignment with the score-marking or index on the case which identifies to the user how much tape has been withdrawn from the case.

The arms or fingers 14 and 17 can extend at least twelve inches at a right angle from the tape 12.

When the mechanic or operator desires to use the tape to measure the distance between two points on opposite sides of an obstruction, (such as shown schematically in dash-dot lines at (19) in FIG. 3), the tape (12) is withdrawn from the case (11) and the arm (14) extended so that the tip (15) can be placed on the distant side of the obstruction (19).

The arm (17) is, thereafter, extended from the case (16) so that the tip (18) can be placed on the opposite side of the obstruction (19).

By adjusting the tape so that the tips (15) and (18) are positioned where the dimensions should be read, the distance in a straight line ("as the crow flies") can be read on the tape (12).

Because the tape (12) is extensible and can be as long as is convenient or is desired (sometimes up to 12 ft.), there is no practical limitation placed upon the distance which can be measured as is the case if one were to use a rigid "tram gauge".

Additionally, it is not necessary for the operator to guess or estimate the distance as he would have in prior practice if a flexible tape were stretched from one end to the other end over an irregular object measuring the girth and thickness, as well as the length and, therefore, having to estimate the straight-line distance between the two points.

It is furthermore to be understood that the present invention may be embodied in other specific forms without departing from the spirit or special attributes, and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. A collapsible measuring tape including:

a housing for said tape, said tape being made of a flexible metal having a first end and a second end and including indicia thereon between said ends, said tape being wound upon itself within said housing, said tape being withdrawble from said housing by manually pulling the first end of said tape away from said housing, said tape being retractable into said housing, a first extensible, telescoping, retractable pointer having an outer end and having a base permanently fastened to said housing and arranged so that the outer end of said first pointer is extendable from its base away from said housing, a second extensible, telescoping, retractable pointer having an outer end and having a base permanently fastened to the first end of said tape and arranged so that the outer end of said second pointer is extendable from its base at a right angle to said tape, said first and second pointers being parallel to each other when their outer ends are extended from their respective bases, said housing including a base marker which is in alignment with said first pointer, said indicia on said tape including a zero marker which is in alignment with said second pointer, the indicia on said tape graduated to exhibit the distance between the outer end of said first pointer and the outer end of said second pointer, and wherein the outer ends of said pointers can extend at least twelve inches from their respective bases.

* * * * *